US009660741B2

(12) United States Patent
Yang et al.

(10) Patent No.: US 9,660,741 B2
(45) Date of Patent: May 23, 2017

(54) METHOD FOR PERFORMING MEASUREMENT

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/113,039

(22) PCT Filed: Jan. 13, 2015

(86) PCT No.: PCT/KR2015/000332
§ 371 (c)(1),
(2) Date: Jul. 20, 2016

(87) PCT Pub. No.: WO2015/115742
PCT Pub. Date: Aug. 6, 2015

(65) Prior Publication Data
US 2017/0005740 A1 Jan. 5, 2017

Related U.S. Application Data

(60) Provisional application No. 61/932,798, filed on Jan. 29, 2014.

(51) Int. Cl.
H04B 17/345 (2015.01)
H04L 5/14 (2006.01)
(Continued)

(52) U.S. Cl.
CPC ......... H04B 17/345 (2015.01); H04L 5/0032 (2013.01); H04L 5/0048 (2013.01);
(Continued)

(58) Field of Classification Search
CPC ............... H04B 17/345; H04L 5/14
See application file for complete search history.

(56) References Cited

U.S. PATENT DOCUMENTS

2012/0327821 A1* 12/2012 Lin ............... H04W 72/048
370/280
2013/0083706 A1 4/2013 Lin
2014/0153453 A1* 6/2014 Park ............... H04B 7/2656
370/280

FOREIGN PATENT DOCUMENTS

KR 1020130009459 A 1/2013
KR 1020130032798 A 4/2013
WO 2013042991 A1 3/2013

OTHER PUBLICATIONS

Huawei et al., "Cross-carrier scheduling design for TDD inter-band CA with different UL-DL configurations", 3GPP TSG RAN WG1 Meeting #68, R1-120018, Jan. 31, 2012, 6 pages.

(Continued)

Primary Examiner — Tuan H Nguyen
(74) Attorney, Agent, or Firm — Lee, Hong, Degerman, Kang & Waimey

(57) ABSTRACT

One disclosure of the present specification provides a method for performing measurement. The method may comprise the steps of: receiving measurement setting information and wireless resource setting information from a serving cell; and receiving setting information for a measurement interval if a frequency band of the serving cell and a frequency band of a neighboring cell belong to different inter-bands, wherein setting information for the measurement interval may indicate a setting in which the number of downlink (DL) subframes is 1 for 5 ms if the serving cell operates with a TDD UL-DL setting of 0 or 6. The method may comprise a step of performing measurement for refer- (Continued)

ence signals from the serving cell and the neighboring cell during the measurement interval.

8 Claims, 15 Drawing Sheets

(51) Int. Cl.
*H04L 5/00* (2006.01)
*H04W 56/00* (2009.01)
*H04W 16/32* (2009.01)
*H04W 88/02* (2009.01)

(52) U.S. Cl.
CPC ............... *H04L 5/14* (2013.01); *H04W 16/32* (2013.01); *H04W 56/0015* (2013.01); *H04W 88/02* (2013.01)

(56) References Cited

OTHER PUBLICATIONS

NEC Laboratories, "Cross-Subframe Co-Channel Interference Mitigation Scheme for LTE-Advanced Dynamic TDD System", Jun. 2013, 5 pages.

\* cited by examiner

METHOD FOR PERFORMING MEASUREMENT

CROSS-REFERENCE TO RELATED APPLICATIONS

This application is the National Stage filing under 35 U.S.C. 371 of International Application No. PCT/KR2015/000332, filed on Jan. 13, 2015, which claims the benefit of U.S. Provisional Application No. 61/932,798, filed on Jan. 29, 2014, the contents of which are all hereby incorporated by reference herein in their entirety.

BACKGROUND OF THE INVENTION

Field of the Invention
The present invention relates to wireless communication.
Related Art
3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in a next-generation mobile communication system, it is expected that a small cell having a small cell coverage radius is added within a coverage of a macro cell.

Meanwhile, the addition of small cells makes it difficult and complicate for terminals to measure cells.

SUMMARY OF THE INVENTION

Accordingly, an object of the present invention is to solve the above-mentioned problems.

To achieve the foregoing aspect, there is provided a method for performing measurement. The method may comprise: receiving measurement configuration information and radio resource configuration information from a serving cell; receiving configuration information on a measurement period when a frequency band of the serving cell and a frequency band of a neighbor cell are different and correspond to inter-bands, the configuration information on the measurement period indicating a configuration in which there is one downlink subframe for 5 ms when the serving cell operates with TD UL-DL configuration 0 or 6; and performing measurement for reference signals from the serving cell and the neighbor cell during the measurement period.

The method may further comprise: receiving a system information block (SIB) comprising information on a TDD UL-DL configuration of the serving cell; and receiving a downlink control channel comprising information on a changed TDD UL-DL configuration as the serving cell applies enhanced Interference Management and Traffic Adaptation (eIMTA).

The configuration information on the measurement period may indicate a configuration based on number of downlink subframes for 5 ms according to the changed TDD UL-DL configuration by application of eIMTA.

The measurement period may be 480 ms when there is one downlink subframe for 5 ms and a measurement band is six resource blocks (RBs) and the measurement period is 240 ms when there is one downlink subframe for 5 ms and a measurement band is 50 RBs.

To achieve the foregoing aspect, there is provided a user equipment (UE) that performs measurement. The UE may comprise: a transceiver to receive measurement configuration information and radio resource configuration information from a serving cell and to receive configuration information on a measurement period when a frequency band of the serving cell and a frequency band of a neighbor cell are different inter-bands, the configuration information on the measurement period indicating a configuration in which there is one downlink subframe for 5 ms when the serving cell operates with TD UL-DL configuration 0 or 6; and a processor to control the transceiver to perform measurement for reference signals from the serving cell and the neighbor cell during the measurement period.

According to the disclosure of the present specification, measurement may be performed efficiently and accurately.

DESCRIPTION OF EXEMPLARY EMBODIMENTS

Figure 1:
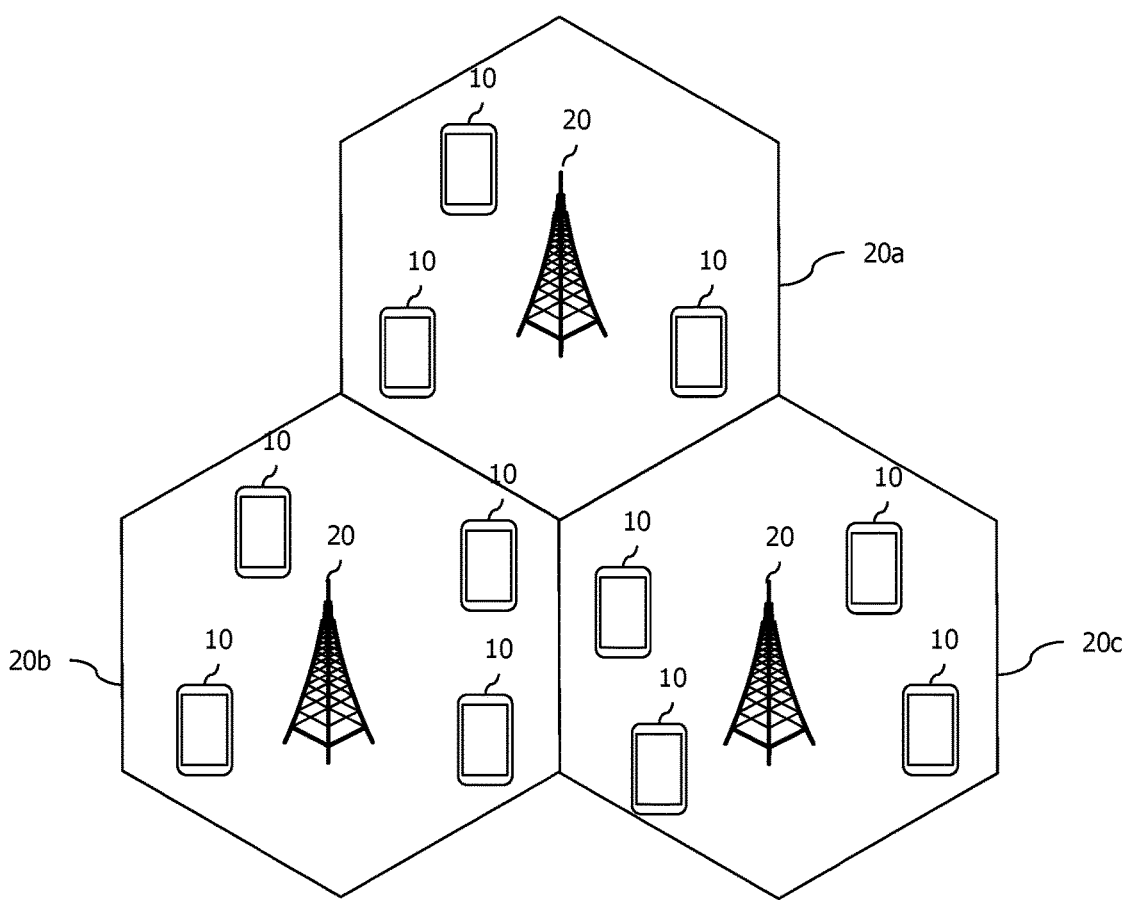
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
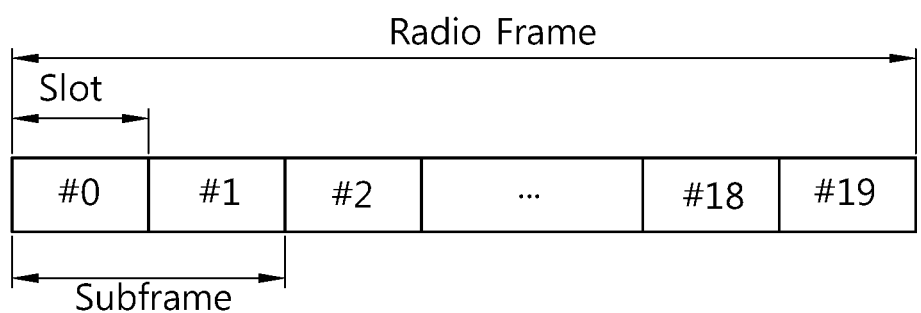
FIG. 2 illustrates a structure of a radio frame according to frequency division duplex (FDD) in 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
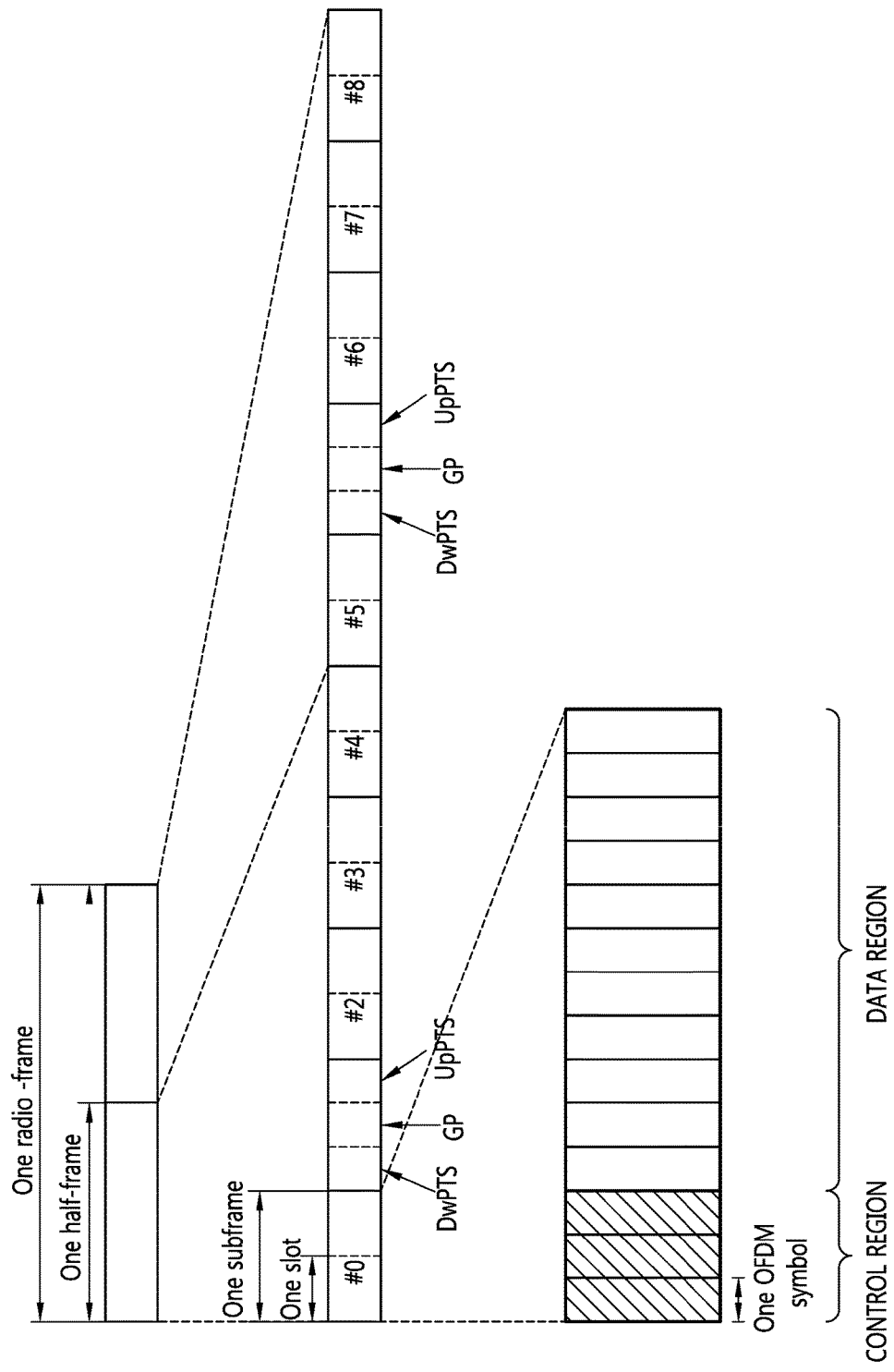
FIG. 3 illustrates a structure of a downlink radio frame according to time division duplex (TDD) in 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS(Downlink Pilot Time Slot: DwPTS), a GP(Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts  | 2192 * Ts | 2560 * Ts | 7680 * Ts  | 2192 * Ts | 2560 * Ts |
| 1 | 19760 * Ts |           |           | 20480 * Ts |           |           |
| 2 | 21952 * Ts |           |           | 23040 * Ts |           |           |
| 3 | 24144 * Ts |           |           | 25600 * Ts |           |           |
| 4 | 26336 * Ts |           |           | 7680 * Ts  | 4384 * Ts | 5120 * ts |
| 5 | 6592 * Ts  | 4384 * Ts | 5120 * ts | 20480 * Ts |           |           |
| 6 | 19760 * Ts |           |           | 23040 * Ts |           |           |
| 7 | 21952 * Ts |           |           | —          |           |           |
| 8 | 24144 * Ts |           |           | —          |           |           |

Figure 4:
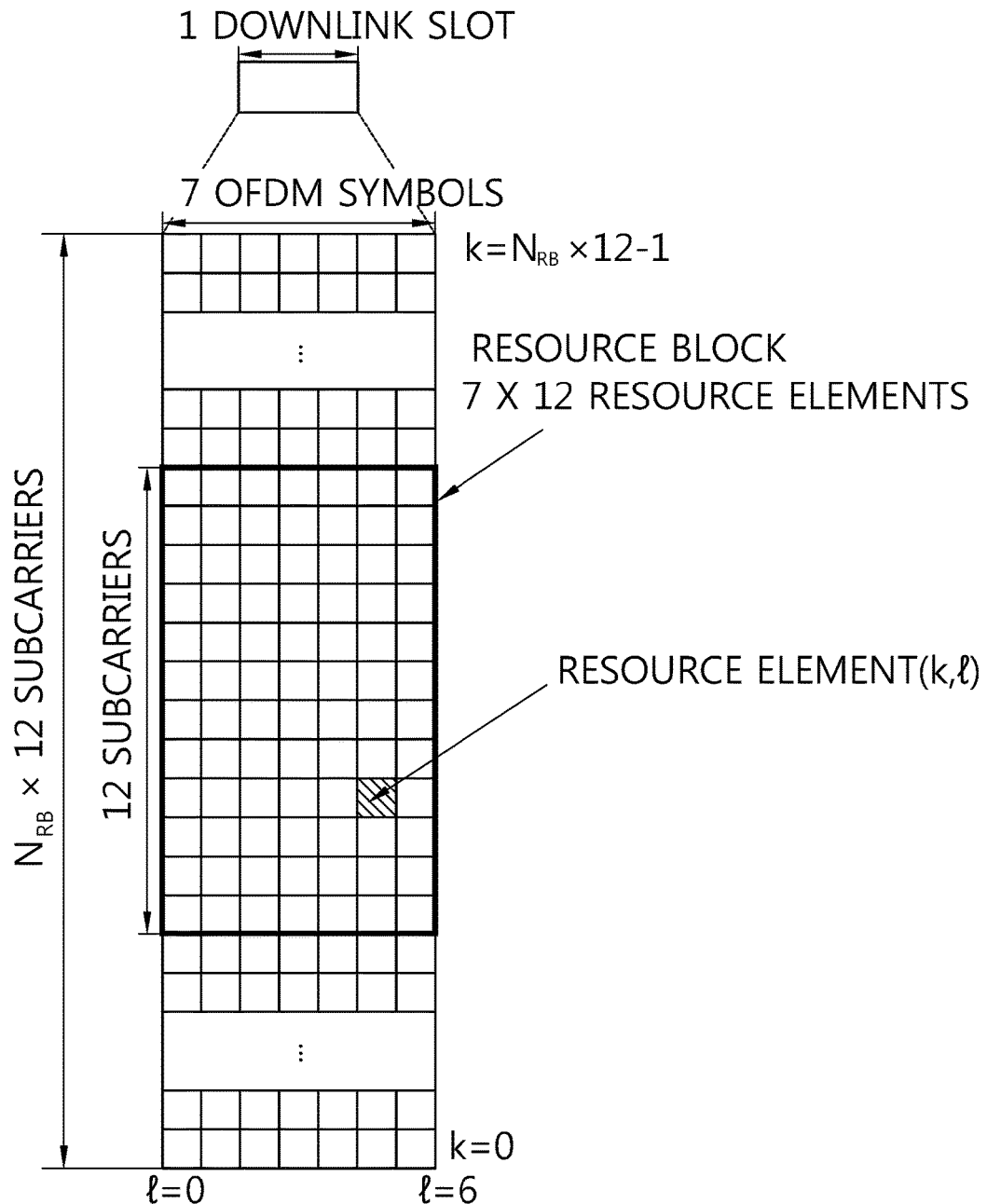
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
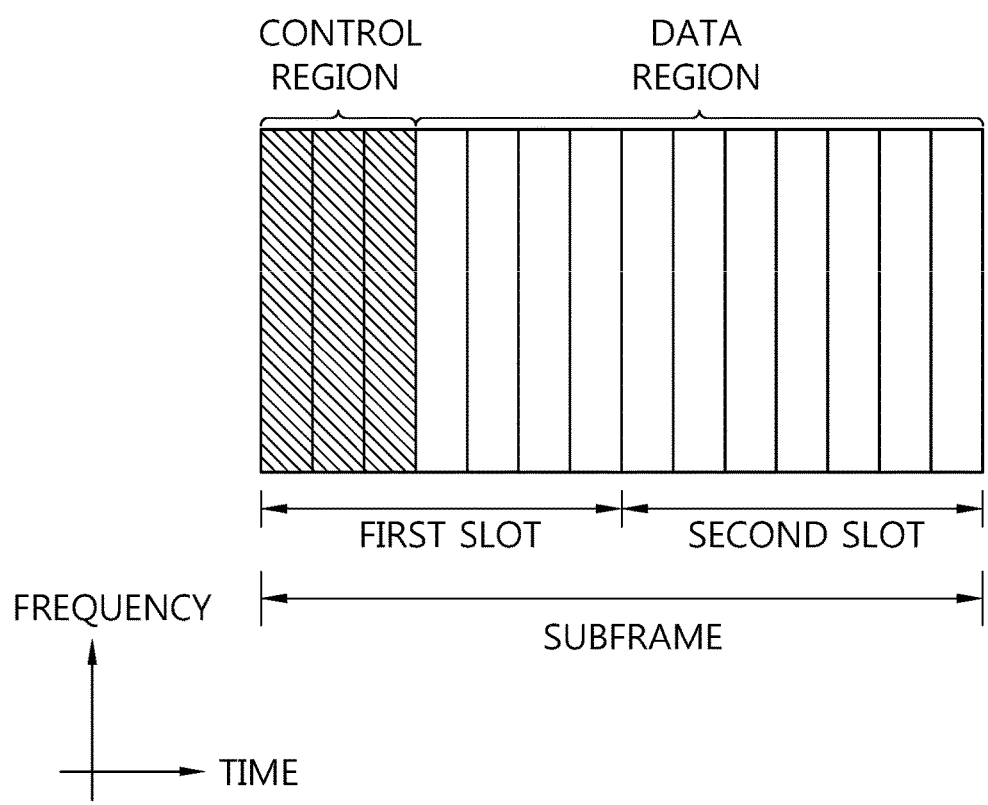
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
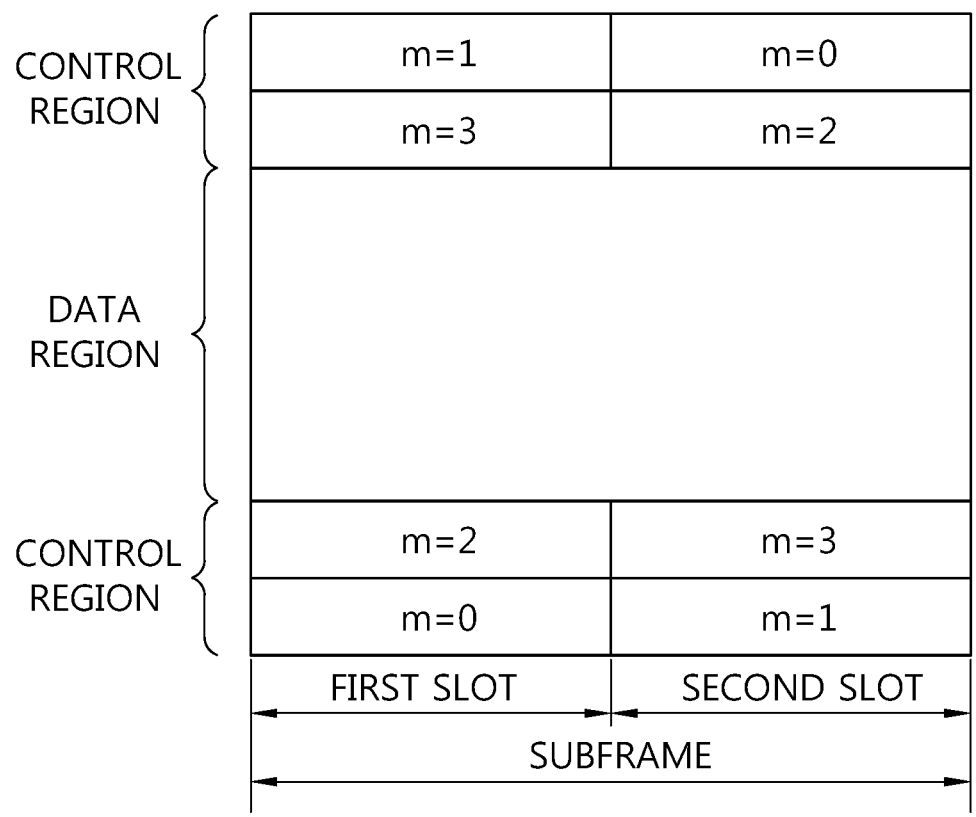
FIG. 6. illustrates a structure of an uplink subframe in 3GPP LTE.
Figure 6:
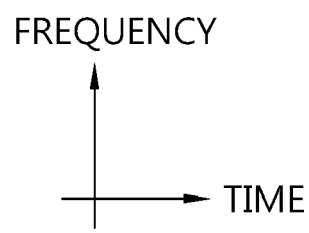

FIG. 6 illustrates a structure of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE-A system may configure a broad band of 20 MHz or more only using the bandwidths of the 3GPP LTE system. Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

<Reference Signal (RS)>

Meanwhile, various reference signals (RSs) are transmitted via a subframe.

An RS is generally transmitted in a sequence. An RS sequence may be a random sequence, without being particularly limited. The RS sequence may be a phase shift keying (PSK)-based computer-generated sequence. Examples of PSK may include binary phase shift keying (BPSK), quadrature phase shift keying (QPSK), and the like. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, and the like. Alternatively, the RS sequence may a pseudo-random (PN) sequence. Examples of the PN sequence include an m-sequence, a computer-generated sequence, a Gold sequence, a Kasami sequence, and the like. Alternatively, the RS sequence may be a cyclically shifted sequence.

Downlink RSs may be divided into a cell-specific RS (CRS), a multicast-broadcast single-frequency network (MBSFN) RS, a UE-specific RS (URS), a positioning RS (PRS), and a channel state information RS (CSI-RS). The CRS is an RS transmitted to all UEs in a cell, which may be used for channel measurement relating to CQI feedback and channel estimation relating to a PDSCH. The MBSFN RS may be transmitted via a subframe assigned for MBSFN transmission. The URS is an RF received by a specific UE or specific UE group in a cell and may also be referred to as a demodulation RS (DM-RS). The DM-RS is generally used by the specific UE or specific UE group for data demodulation. The PRS may be used to estimate the position of a UE. The CSI-RS is used by an LTE-A UE for channel estimation relating to a PDSCH. The CSI-RS is relatively sparsely disposed in the frequency domain or time domain and may be punctured in a data region of a normal subframe or MBSFN subframe.

Figure 7:
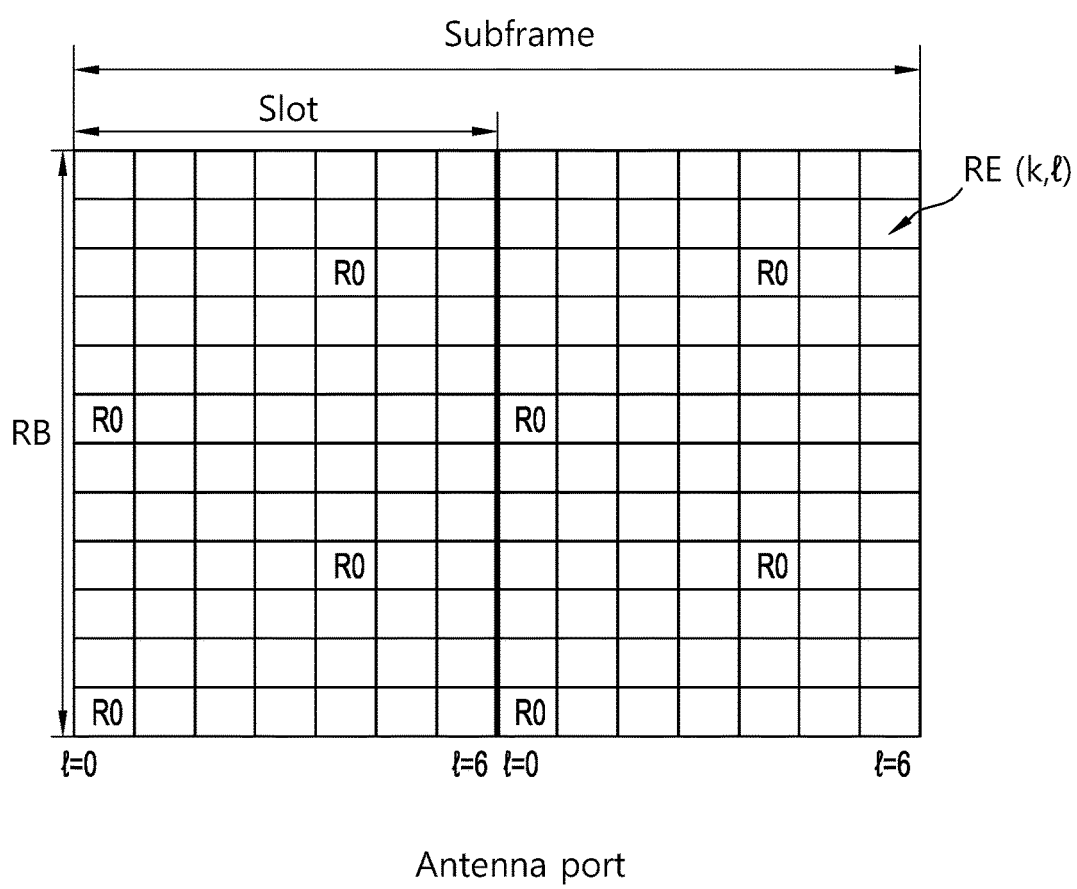
FIG. 7 illustrates an example of a pattern of CRSs mapped to RBs when a base station (BS) usese one antenna port.

FIG. 7 illustrates an example of a pattern of CRSs mapped to RBs when a BS usese one antenna port.

Referring to FIG. 7, R0 represents REs mapped to CRSs transmitted via antenna port 0 of the BS.

A CRS is transmitted via all downlink subframes in a cell supporting PDSCH transmission. The CRS may be transmitted on antenna ports 0 to 3 and may be defined only for Δf=15 kHz. A pseudo-random sequence $r_{l,ns}(m)$ generated from a seed value based on a cell identity (ID) is resource-mapped to a complex-valued modulation symbol $a^{(p)}_{k,l}$. Here, $n_s$ is the number of a slot in one radio frame, p is an antenna port, and l is the number of an OFDM symbol in a slot. k is a subcarrier index. l and k are represented by the following equation.

$$k = 6 \, m + (v + v_{shift}) \bmod 6 \quad \text{[Equation 1]}$$

$$l = \begin{cases} 0, N^{DL}_{symb} - 3 & \text{if } p \in \{0, 1\} \\ 1 & \text{if } p \in \{2, 3\} \end{cases}$$

$$v_{shift} = N^{cell}_{ID} \bmod 6$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

In the above equation, p is an antenna port, and $n_s$ is slot number 0 or 1 k has six shifted indices according to a cell ID ($N^{cell}_{ID}$). Thus, cells with cell IDs of multiples of 6, for example, 0, 6, 12, etc., transmit a CRS at the same subcarrier position k.

In the above equation, l is determined according to antenna port p, and possible values of l are 0, 4, 7, and 11. Therefore, the CRSs are transmitted on symbols 0, 4, 7, and 11.

An RE assigned for a CRS of one antenna port may not be used for transmission via another antenna port and needs to be set to 0. Further, in an MBSFN subframe, a CRS is transmitted only via a non-MBSFN region.

Figure 8A:
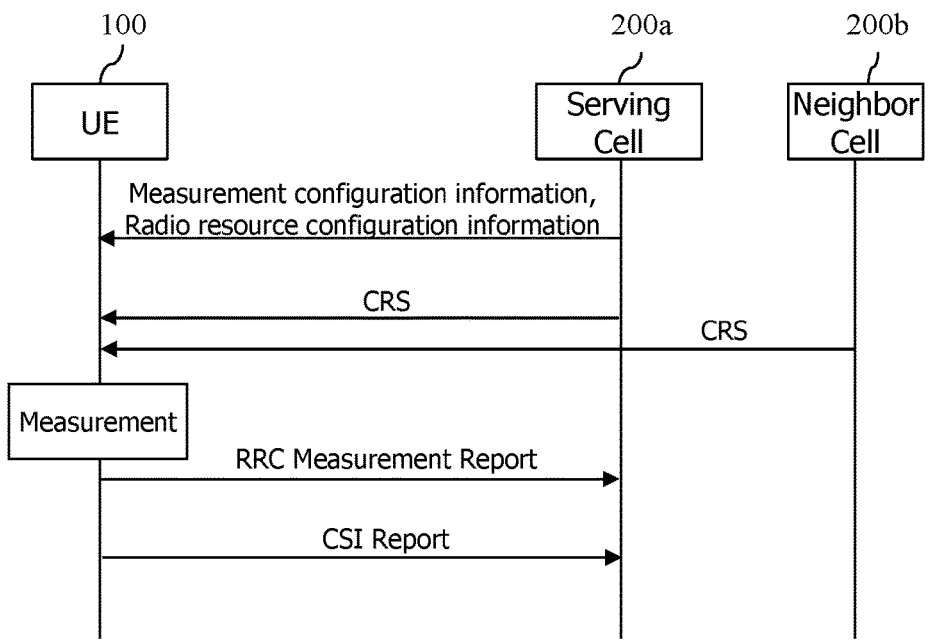
FIG. 8a illustrates measurement and measurement report procedures.

FIG. 8a illustrates measurement and measurement report procedures.

In a mobile communication, it is essential to support the mobility of a UE 100. Thus, the UE 100 continuously measures the quality of a serving cell that is currently providing a service and the quality of a neighbor cell. The UE 100 reports a measurement result to a network at a proper time, and the network provides optimal mobility for the UE through a handover or the like. Measurement for such a purpose is often called radio resource management (RRM).

Meanwhile, the UE 100 monitors the downlink quality of a primary cell (Pcell) based on a CRS, which is called radio link monitoring (RLM). For RLM, the UE 100 estimates the downlink quality and compares the estimated downlink quality with thresholds, for example, Qout and Qin. The threshold Qout is defined as a level at which downlink reception may not be stably performed, which corresponds to a 10% error of PDCCH transmission in view of a PCFICH error. The threshold Qin is defined as a level at which a downlink is too remarkably reliable, as compared with Qout, which corresponds to a 2% error o PDCCH transmission of a PCFICH error.

As illustrated in FIG. 8a, when the serving cell 200a and the neighbor cell 200b respectively transmit CRSs to the UE 100, the UE 100 performs measurement through the CRSs and transmits an RRC measurement report message including a measurement result to the serving cell 200a.

Here, the UE 100 may perform measurement using the following three methods.

1) Reference Signal Received Power (RSRP): denotes the average received power of all REs carrying a CRS transmitted across a band. Here, the average received power of all REs carrying a CSI RS instead of a CRS may be measured.

2) Received Signal Strength Indicator (RSSI): denotes received power measured in the entire band. RSSI includes all of a signal, interference, and thermal noise.

3) Reference Symbol Received Quality (RSRQ): denotes CQI and may be determined as RSRP/RSSI based on a measurement bandwidth or sub-band. That is, RSRQ denotes signal-to-noise interference ratio (SINR). Since RSRP does not provide sufficient mobility information, RSRQ may be used, instead of RSRP, in a handover or cell reselection process.

RSRQ may be obtained by RSSI/RSSP.

Meanwhile, for the measurement, the UE 100 receives a measurement configuration information element (IE) from the serving cell 100a. A message including a measurement configuration IE is referred to as a measurement configuration message. Here, the measurement configuration IE may be received through an RRC connection reestablishment message. When the measurement result satisfies a report condition in the measurement configuration information, the UE reports the measurement result to a BS. A message including a measurement result is referred to as a measurement report message.

The measurement configuration IE may include measurement object information. The measurement object information is information on an object to be measured by the UE. A measurement object includes at least one of an intra-frequency measurement object as an object of intra-cell measurement, an inter-frequency measurement object as an object of inter-cell measurement, and an inter-RAT measurement object as an object of inter-RAT measurement. For example, the intra-frequency measurement object may refer to a neighbor cell having the same frequency band as the serving cell, the inter-frequency measurement object may refer to a neighbor cell having a different frequency band from the serving cell, and the inter-RAT measurement object may refer to a neighbor cell having a different RAT from an RAT of the serving cell.

Specifically, the measurement configuration IE may include IEs listed in the following table.

TABLE 3

MeasConfig ::=
-- Measurement objects
    measObjectToRemoveList
    measObjectToAddModList The Measurement objects IE includes measObjectToRemoveList that denotes a list of measObject to remove and measObjectToAddModList denoting a list of that denotes a list of measObject to newly add or modify.

measObject includes MeasObj ectCDMA2000, MeasObjectEUTRA, MeasObjectGERAN, and the like depending on communication technology.

Meanwhile, a MeasObjectEUTRA IE includes information applied for intra-frequency or inter-frequency relating to E-UTRA cell measurement. The MeasObjectEUTRA IE is illustrated in the following table.

TABLE 8

1) MeasObjectEUTRA
- neighCellConfig
  - measSubframePatternConfigNeigh-r10
2) MeasSubframePatternConfigNeigh-r10
  measSubframePatternNeigh-r10
  measSubframeCellList-r10

The MeasObjectEUTRA IE is illustrated more specifically as follows.

TABLE 5

Description of MeasObjectEUTRA field carrierFreq
identifies E-UTRA carrier frequency at which this configuration is available.
neighCellConfig
denotes configuration information on a neighbor cell.
measCycleSCell
Parameter: $T_{measure\_scc}$
This parameter is used a secondary cell (SCell) operates at a frequency indicated by measObject and is deactivated.
measSubframeCellList
A list of cells to which measSubframePatternNeigh is applied.
If not included, the UE applies a time domain measurement resource restriction pattern to all neighbor cells.
measSubframePatternNeigh
A time domain measurement resource restriction pattern applied to measure the RSRP and RSRQ of a neighbor cell on a carrier frequency indicated by carrierFreq As described above, the MeasObjectEUTRA IE includes configuration information on a neighbor cell (that is, NeighCellConfig), a time domain measurement resource restriction pattern applied to measure a neighbor cell (that is, a measurement subframe pattern of a neighbor cell or measSubframePatternNeigh), and a list of cells to which the pattern is applied (that is, measSubframeCellList).

Meanwhile, as illustrated, the UE 100 also receives a radio resource configuration IE The radio resource configuration IE is used to set/modify/release a radio bearer or to modify an MAC configuration. The radio resource configuration IE includes subframe pattern information. The subframe pattern information is information on a time domain measurement resource restriction pattern for measurement of the RSRP and RSRQ of the serving cell (for example, the primary cell).

The radio resource configuration IE includes fields listed in the following table.

TABLE 6

RadioResourceConfigDedicated
measSubframePatternPCell-r10

The RadioResourceConfigDedicated field includes factors listed below.

TABLE 7

Description of RadioResourceConfigDedicated field logicalChannelConfig
An option used to indicate whether a logic channel configuration is explicitly signaled for SRBs or is set as a default logic channel configuration for SRB1.
logicalChannelIdentity
A logic channel identifier to identify both uplink (UL) and downlink (DL)
mac-MainConfig
An option used to indicate whether mac-MainConfig is explicitly signaled or is set as a default MAC main configuration.
measSubframePatternPCell
A time domain measurement resource restriction pattern for measurement (RSRP and RSRQ) of a primary cell (Pcell, that is, first cell or serving cell)

As described above, the RadioResourceConfigDedicated field measSubframePatternPCell or meas SubframePatternSery indicating a time domain measurement resource restriction pattern (that is, a measurement subframe pattern of the serving cell) applied to measurement (RSRP and RSRQ) of the primary cell (Pcell or serving cell).

Figure 8B:
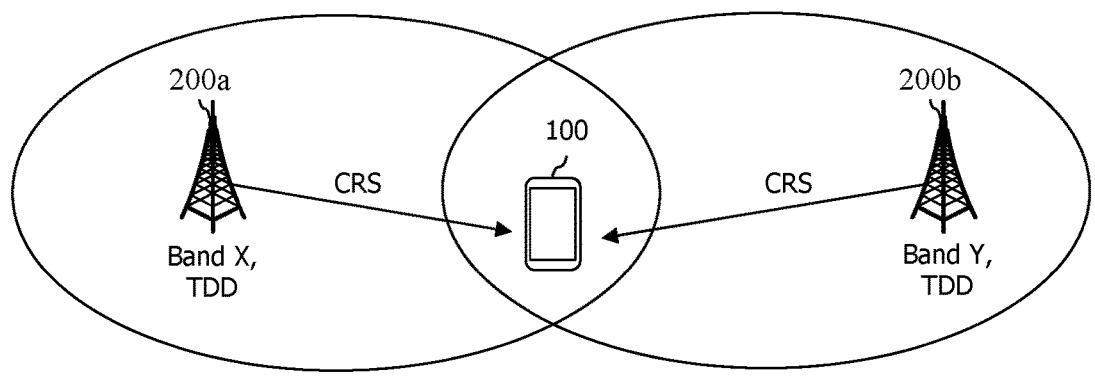
FIG. 8b illustrates an example of measuring two TDD cells operating in different frequency bands.

FIG. 8b illustrates an example of measuring two TDD cells operating in different frequency bands.

Referring to FIG. 8b, a serving cell 200a of a UE 100 is operating in frequency band X based on TDD, and a neighbor cell 200b is operating in frequency band Y based on TDD. Frequency band X and frequency band Y are different inter-bands.

In this situation, when a measurement gap is scheduled or the UE 100 has capability to perform measurement without the measurement gap, the UE 100 needs to identify the neighbor cell 200b operating in an inter-band, frequency band Y, at a predetermine time, for example, $T_{identify\_Inter}$ $$T_{Identify\_Inter} = T_{Basic\_Identify\_Inter} \cdot \frac{480}{T_{Inter1}} \cdot N_{freq} \text{ ms} \quad \text{[Equation 2]}$$

Here, $T_{Basic\_Identify\_Inter}$ is 480 ms, which is the maximum time allowed for the UE to identify a new cell, which is the neighbor cell 200b. $N_{freq}$ is the total number of E-UTRA frequencies to be monitored for RRC reestablishment, which is 1 when a target primary (Pcell) is known. $T_{inter1}$ is the minimum time, out of 480 ms, available for measurement of a cell in an inter-band frequency, which may be, for example, 30 ms.

Meanwhile, when a measurement gap is scheduled for measurement at a TDD inter-band frequency or the UE 100 has capability to perform measurement without the measurement gap, a physical layer of the UE 100 reports measured RSRP and RSRQ to the serving cell through a higher layer if the measured RSRP and RSRQ during a measurement period ($T_{Measurement\_Period\_TDD\_Inter}$) satisfy predetermined measurement accuracy.

Here, the measurement period ($T_{Measurement\_Period\_TDD\_Inter}$) is defined as in the following table.

Whenever a TDD cell is measured at an inter-band frequency, the UE may need to measure RSRPs and RSRQs of at least four cells during the measurement period ($T_{Measurement\_Period\_TDD\_Inter}$).

<Introduction of Small Cell>

Meanwhile, in a next-generation mobile communication system, it is expected that a small cell having a small cell coverage radius is added in the coverage of a legacy cell and that the small cell handles a greater amount of traffic. The legacy cell has a greater coverage than that of the small cell, and thus is also referred to as a macro cell, which is described with reference to FIG. 9.

Figure 9:
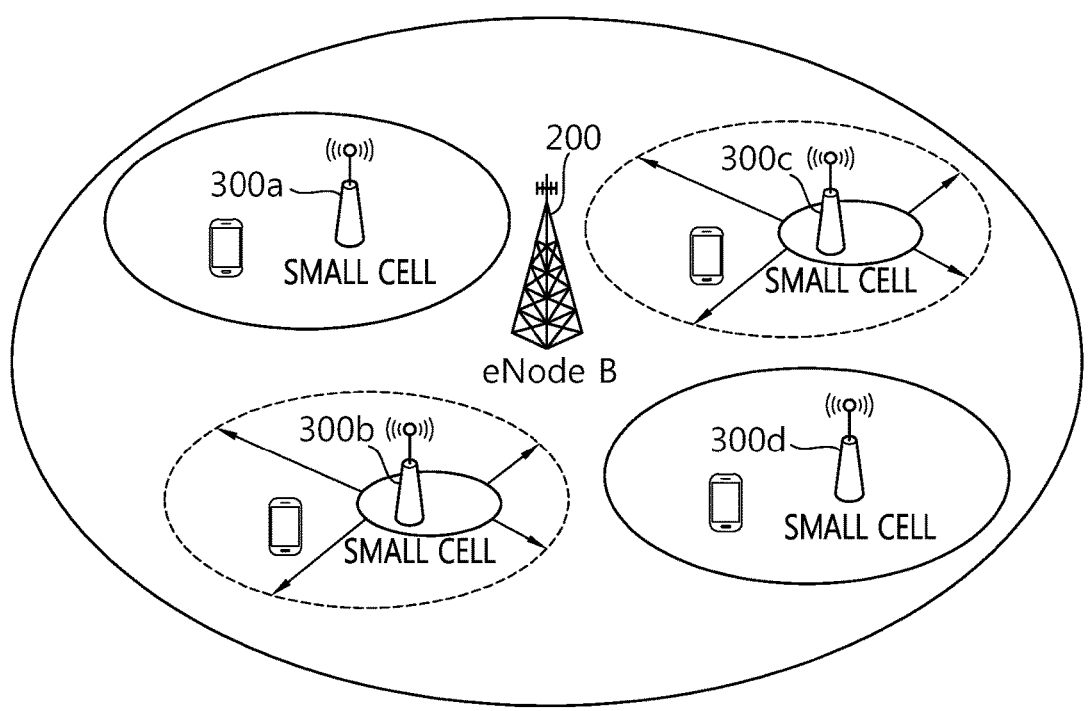
FIG. 9 illustrates a heterogeneous network environment in which a macro cell and a small cell coexist and which is possibly used in a next-generation wireless communication system.

FIG. 9 illustrates a heterogeneous network environment in which a macro cell and a small cell coexist and which is possibly used in a next-generation wireless communication system.

FIG. 9 shows a heterogeneous network environment in which a macro cell of a legacy BS 200 overlaps with one or more small cells of small BSs 300a, 300b, 300c, and 300d. The legacy BS provides a greater coverage than the small BSs and thus is also referred to as a macro BS (macro eNodeB (MeNB)). In the present specification, the macro cell and the MeNB may be used together. A UE having access to the macro cell 200 may be referred to as a macro UE. The macro UE receives a downlink signal from the MeNB and transmits an uplink signal to the MeNB.

In this heterogeneous network, coverage holes of the macro cell may be filled by configuring the macro cell as a primary cell (Pcell) and by configuring the small cells as secondary cells (Scells). In addition, overall performance may be boosted by configuring the small cells as Pcells and by configuring the macro cell as a Scell.

However, the introduction of small cells may aggravate inter-cell interference.

A basic method for solving such an interference problem is using different frequencies for cells. However, since a frequency is a scarce and expensive resource, a method using frequency division is not a popular solution among mobile carriers.

TABLE 8

| Configuration | Measurement band [RB] | Number of UL and DL subframes for half (5 ms) of radio frame length | | DwPTS | | $T_{Measurement\_Period\_TDD\_Inter}$ [ms] |
| | | Number of DL subframes | Number of UL subframes | Normal CP | Extended CP | |
|---|---|---|---|---|---|---|
| 0 | 6 | 2 | 2 | 19760 $T_s$ | 20480 $T_s$ | 480 × $N_{freq}$ |
| 1 (Footnote 1) | 50 | 2 | 2 | 19760 $T_s$ | 20480 $T_s$ | 240 × $N_{freq}$ |

(Footnote 1): optional

According to configuration 0, when the measurement band is six RBs and the number of DL subframes for 5 ms is two, the measurement period ($T_{Measurement\_Period\_TDD\_Inter}$) is 480×$N_{freq}$. According to configuration 1 when the measurement band is 50 RBs and the number of DL subframes for 5 ms is two, the measurement period ($T_{Measurement\_Period\_TDD\_Inter}$) is 240×$N_{freq}$. Here, $N_{freq}$ is 1 since the target primary cell (Pcell) is known.

In the above table, since configuration 0 is a default and configuration 1 is selectively used, a signal for distinguishing configuration 0 and configuration 1 is not transmitted to the UE. Thus, the UE basically performs measurement according to configuration 0.

Thus, in the 3GPP, time division is employed to solve the inter-cell interference problem.

Accordingly, as one interference coordination method of the 3GPP, enhanced inter-cell interference coordination have been under active research in recent years.

A time division mode introduced in LTE Release-10 is called enhanced inter-cell interference coordination (enhanced ICIC) in that the time division mode has evolved from the existing frequency division mode. In the time division mode, defining a cell causing interference as an aggressor cell or primary cell and defining a cell receiving interference as a victim cell or secondary cell, the aggressor cell or primary cell suspends data transmission in a specific frame to allow a UE to maintain access to the victim cell or secondary cell in the subframe. That is, in this method, when heterogeneous cells coexist, one cell temporarily suspends transmitting a signal to a UE having considerably high interference in one region, thereby hardly sending an interference signal.

Meanwhile, the specific frame in which data transmission is suspended is referred to as an almost blank subframe (ABS), in which no data but essential control information is transmitted. The essential control information is, for example, a CRS. Thus, in a subframe applied as an ABS, no data is transmitted but only a CRS is transmitted on symbols 0, 4, 7, and 11.

Figure 10A:
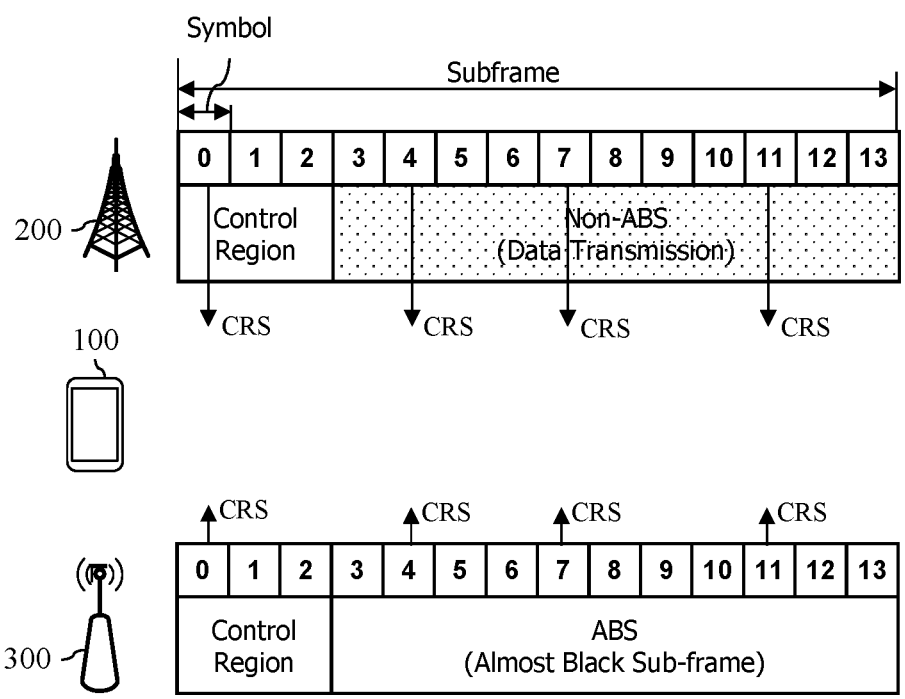
FIG. 10a illustrates an example of enhanced inter-cell interference coordination (eICIC) for solving interference between BSs.

FIG. 10a illustrates an example of enhanced inter-cell interference coordination (eICIC) for solving interference between BSs.

Referring to FIG. 10a, a BS 200 of a macro cell performs data transmission in a data region of an illustrated subframe.

Here, a BS 300 of a small cell applies eICIC in order to solve interference. That is, when eICIC is applied, the subframe operates as an ABS, and thus no data may be transmitted in the data region.

Here, only a CRS may be transmitted on symbols 0, 4, 7, and 11 in the subframe operating as the ABS.

Figure 10B:
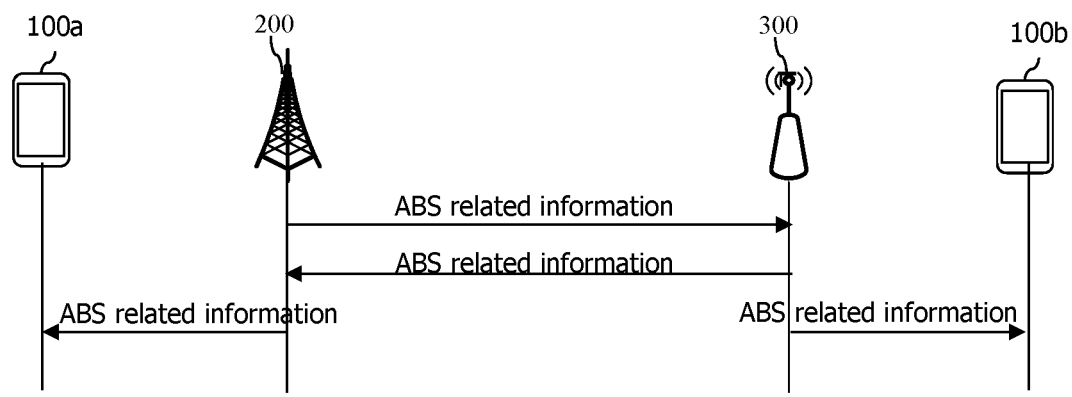
FIG. 10b illustrates an example of exchanging ABS-related information.

FIG. 10b illustrates an example of exchanging ABS-related information.

As illustrated in FIG. 10b, pieces of ABS-related information may be exchanged through interface X2 between a BS 200 of a macro cell and a BS 300 of a small cell.

Further, the BS 200 of the macro cell and the BS 300 of the small cell may transmit the pieces of ABS-related information to serving UEs 100a and 100b thereof, respectively.

Each of the BS 200 of the macro cell and the BS 300 of the small cell may set a measurement subset for the serving UE 100a/100b thereof based on one or more of own ABS-related information thereof and the ABS-related information of the counterpart and may transmit the measurement set.

The BS 200/300 of the corresponding cell transmits no downlink signal or transmits a downlink signal with reduced power in a downlink subframe set as an ABS. Thus, the downlink subframe set as the ABS may cause smaller interference to the coverage of another cell than a downlink subframe not set as an ABS. As such, since an interference level may change depending on whether a corresponding subframe is set as an ABS, the UE 100 performs measurement only in a specific subframe designated in advance.

To this end, the BS 200/300 of the corresponding cell may instruct the serving UE100a/100b thereof to perform measurement only in a specific subframe based on one or more of own ABS pattern information thereof and ABS pattern information of the counterpart, which is called restricted measurement. Such an instruction may be transmitted through a higher-layer signal. The higher-layer signal may be an RRC signal. The signal may be a CQI-ReportConfig element.

The ABS-related information includes ABS information and an ABS state.

First, the ABS information may include one or more of IEs listed, for example, in the following table. ABS pattern information is information on a subframe to be used as an ABS in a bitmap, which may include 40-bit bitmaps in FDD and up to 70-bit bitmaps in TDD. In FDD, for example, 40 bits denote 40 subframes, a bit value of 1 denotes an ABS, and a bit value of 0 is a normal subframe which is a non-ABS. A measurement subset is a subset of the ABS pattern information, which also includes 40 bit bitmaps in FDD and up to 70 bit bitmaps in TDD. The measurement subset is set for restricted measurement of a UE.

TABLE 9

| IE | Description |
|---|---|
| ABS pattern information | At each position of a bitmap, value "1" denotes an ABS and value "0" denotes a non-ABS. The first position of an ABS pattern is subframe 0 in a radio subframe with SFN=. An ABS pattern is continuously shown in all radio frames. The maximum number of subframes is 40. |
| Measurement subset | Denotes a subset of ABS pattern information and is used for particular measurement of a UE |
| ABS disabled | Indicates that interference coordination by an ABS is disabled. |

Next, the ABS state is used for a cell to determine whether to change an ABS pattern. Available ABS pattern information is a subset of the ABS pattern information, which is also in a bitmap. The available ABS pattern information indicates whether a subframe designated as an ABS is properly used for interference mitigation. A downlink ABS state indicates the ratio of the number of scheduled downlink RBs in a subframe indicated by the available ABS pattern information to the number of RBs to be protected through an ABS that are assigned for a UE among the downlink RBs, which is information indicating how efficiently and properly a victim cell uses an ABS for purposes.

TABLE 10

| IE | Description |
|---|---|
| Downlink ABS state | The percentage of used ABS resources, in which the numerator is the number of RBs in an ABS indicated by available ABS pattern information and the denominator is the total number of RBs in the ABS indicated by the available ABS pattern information. |
| Availability of ABS pattern information | Each position in a bitmap indicates a subframe, value "1" indicates an ABS designated to be protected from inter-cell interference, and value "0" is used for all other subframes. A pattern expressed in a bitmap consists of subsets of corresponding ABS pattern information or consists of the same ABS pattern information. |

The measurement subset including subsets of the ABS pattern information is a subframe used as an ABS, and a corresponding cell may arbitrarily determine whether to employ other subframes included in an ABS pattern as an ABS depending on traffic load.

Figure 11A:
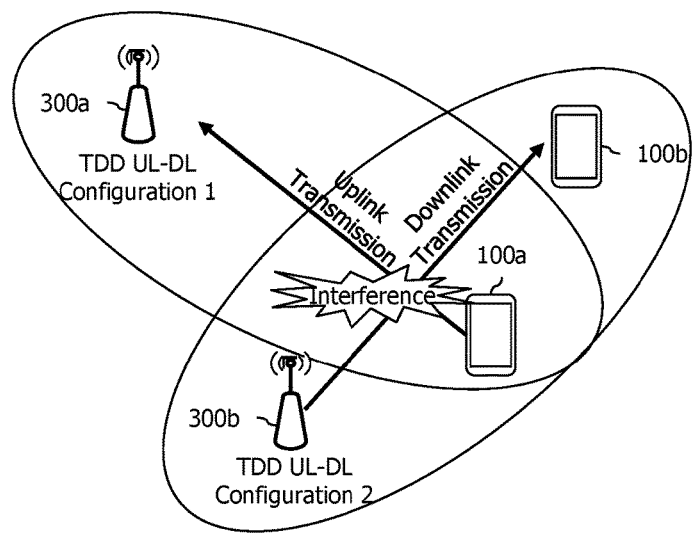
FIGS. 11a and 11b illustrate an example in which an interference problem occurs when two cells use different TDD UL-DL configurations.
Figure 11B:
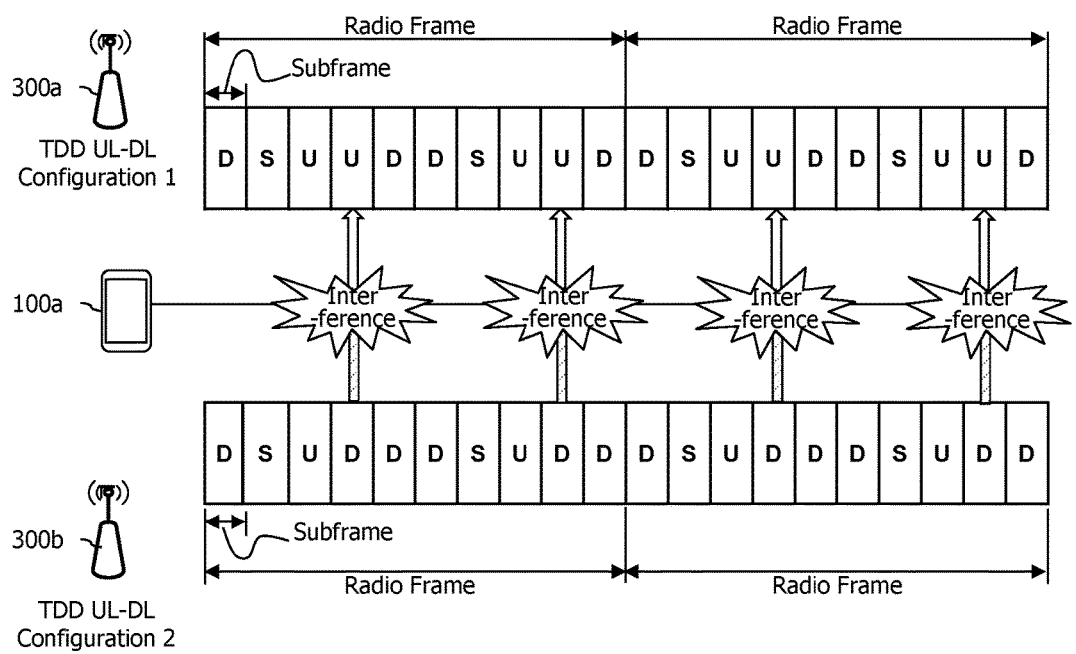

FIGS. 11a and 11b illustrate an example in which an interference problem occurs when two cells use different TDD UL-DL configurations.

FIGS. 11a and 11b illustrate that a small cell 300a which is a serving cell of UE#1 100a uses TDD UL-DL configuration 1 in Table 1 and a small cell 300b which is a serving cell of UE#2 100b uses TDD UL-DL configuration 2 in Table 1.

When UE#1 100a transmits an uplink signal to the small cell 300a in fourth and ninth subframes which are uplink subframes according to TDD UL-DL configuration 1 and the small cell 300b transmits a downlink signal in fourth and ninth subframes which are downlink subframes according to TDD UL-DL configuration 2, the transmissions may interfere with each other.

Conventionally, disposition of cells using different TDD UL-DL configurations is not allowed due to such an interference problem.

However, to process gradually increasing traffic, it is necessary to dynamically change TDD UL-DL configurations in order to flexibly deal with the interference problem.

Thus, enhanced Interference Management and Traffic Adaptation (eIMTA) has been studied to solve the interference problem occurring when two cells use different TDD UL-DL configurations. eIMTA enables a TDD uplink subframe to be dynamically changed to a downlink subframe for the purpose of interference management. Also, eIMTA enables a TDD uplink subframe to be dynamically changed to a downlink subframe for the purpose of accommodating gradually increasing downlink traffic, which will be described with reference to FIG. 12.

Figure 12A:
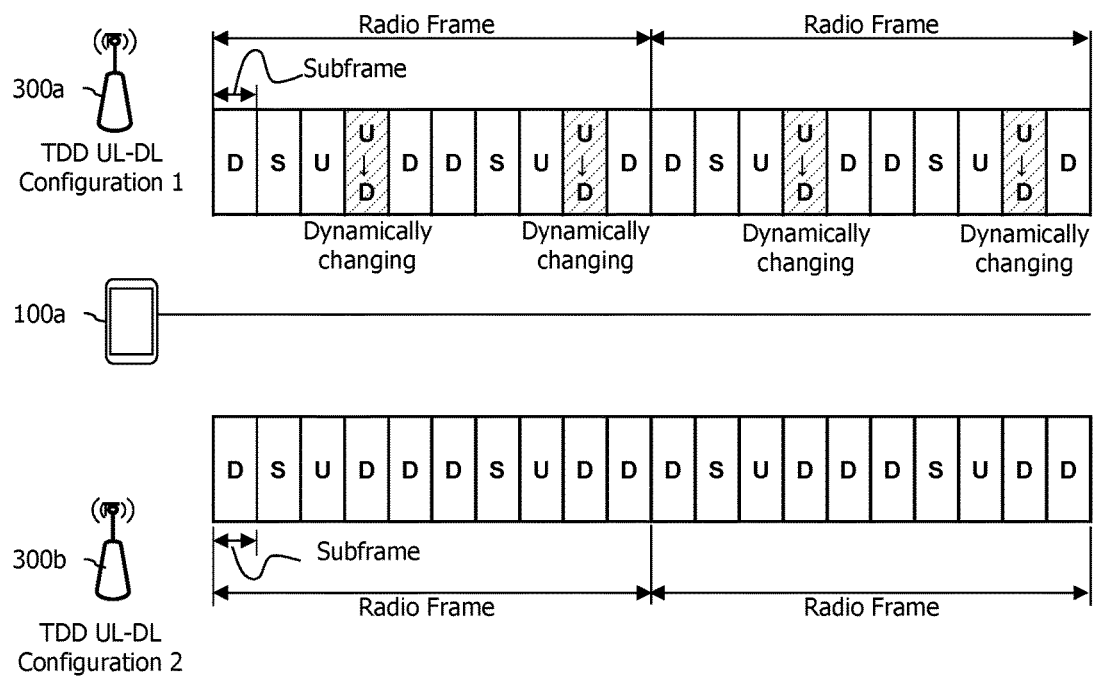
FIGS. 12a and 12b briefly illustrate an eIMTA scheme.
Figure 12B:
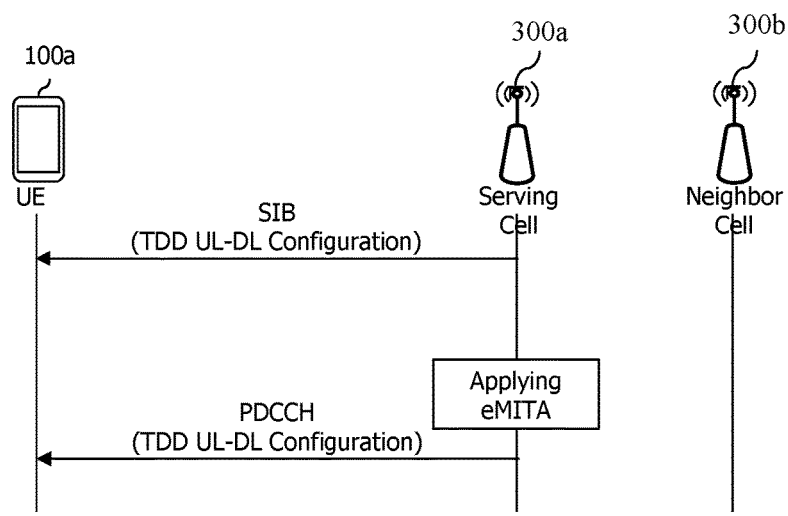

FIGS. 12a and 12b briefly illustrate an eIMTA scheme.

As illustrated in FIG. 12a, a serving cell 300a may dynamically change an uplink subframe to a downlink subframe. For example, as illustrated in FIG. 12a, the serving cell 300a dynamically changes uplink subframes according to TDD UL-DL configuration 1, that is, fourth and ninth subframes, into downlink subframes and transmits downlink data in the downlink subframes.

Referring to FIG. 12b, the TDD UL-DL configuration of the serving cell 300a is broadcast through a system information block (SIB). If the serving cell 300a determines to apply eIMTA, the serving cell 300a may transmit information on a changed TDD UL-DL configuration to a UE 100 through a PDCCH. Subsequently, according to the changed TDD UL-DL configuration, an uplink subframe may be changed to a downlink subframe.

Figure 13:
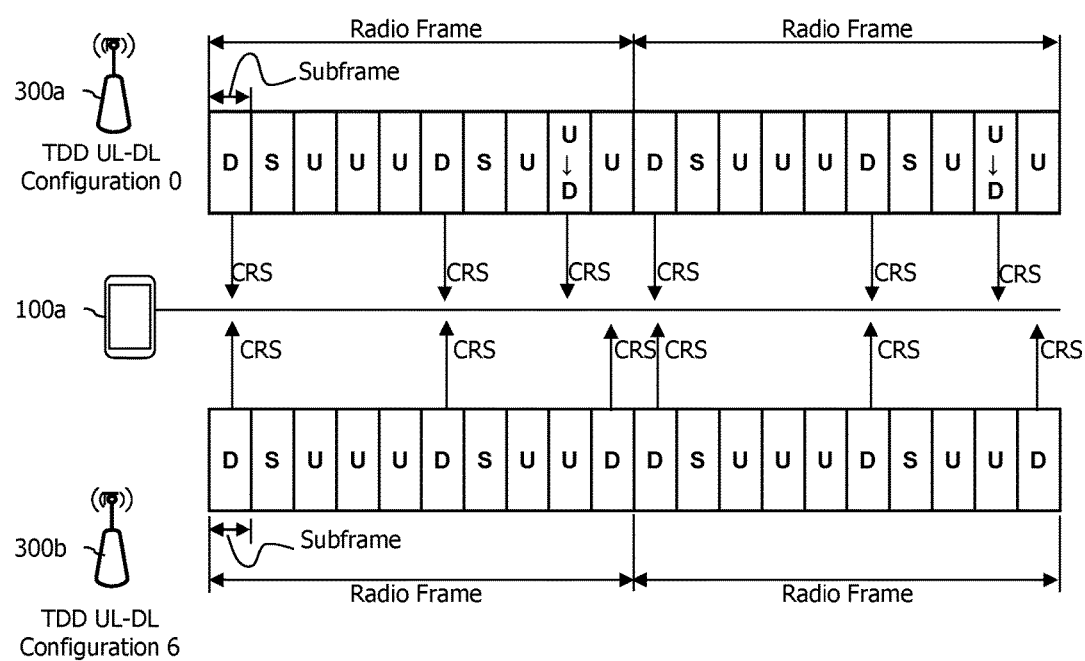
FIG. 13 illustrates an example in which a UE has difficulty in measurement when two cells use different TDD UL-DL configurations according to the eIMTA scheme.

FIG. 13 illustrates an example in which a UE has difficulty in measurement when two cells use different TDD UL-DL configurations according to the eIMTA scheme.

Before the eIMTA scheme is developed, two cells are forced to use the same TDD UL-DL configuration due to interference between the two cells. The eIMTA scheme, however, allows two cells to use different TDD UL-DL configurations in a real environment.

FIG. 13 illustrates that a small cell 300a which is a serving cell of UE#1 100a uses TDD UL-DL configuration 0 in Table 1 and a small cell 300b which is a neighbor cell of uses TDD UL-DL configuration 6 in Table 1.

According to TDD UL-DL configuration 0 and TDD UL-DL configuration 6, there is just one downlink subframe for the half of the radio frame length, 5 ms, in Table 1. Thus, it is necessary to modify the measurement period ($T_{Measurement\_Period\_TDD\_Inter}$) defined in Table 8 assuming that there are two downlink subframes for 5 ms.

Therefore, the present specification illustrates a method for solving the foregoing problem hereinafter.

<Disclosure of the Present Specification>

It is necessary to add a new configuration other than configuration 0 and configuration 1 in Table 8 so that a UE properly performs measurement even when a serving cell or neighbor cell uses TDD UL-DL configuration 0 in which there is just one downlink subframe for the half of the radio frame length, 5 ms. Here, the newly added configuration is also based on measurement bands of both 6 RBs and 50 RBs, like existing configurations 0 and 1.

Thus, the present specification may define measurement periods ($T_{Measurement\_Period\_TDD\_Inter}$) including newly added configurations as in the following table.

TABLE 11

| Configuration | Measurement band [RB] | Number of DL subframes | Number of UL subframes | DwPTS Normal CP | DwPTS Extended CP | $T_{Measurement\_Period\_TDD\_Inter}$ |
|---|---|---|---|---|---|---|
| 0 | 6 | 2 | 2 | 19760 $T_s$ | 20480 $T_s$ | 480 × $N_{freq}$ |
| 1 (Footnote 1) | 50 | 2 | 2 | 19760 $T_s$ | 20480 $T_s$ | 240 × $N_{freq}$ |
| 2 | 6 | 1 | 3 | 19760 $T_s$ | 20480 $T_s$ | 480 × $N_{freq}$ |
| 3 (Footnote 1) | 50 | 1 | 3 | 19760 $T_s$ | 20480 $T_s$ | 240 × $N_{freq}$ |

(Number of UL and DL subframes for half (5 ms) of radio frame length)

(Footnote 1): optional

In the above table, it is necessary to distinguish configuration 0 and configuration 2 using the same measurement band of six RBs. Thus, the serving cell may transmit a signal for such distinguishment to the UE. This is different from the foregoing description with reference to FIG. 8, in which a signal for distinguishing configuration 0 and configuration 1 is not transmitted to the UE and the UE basically performs measurement according to configuration 0.

Meanwhile, simulation conditions for TDD-TDD interfrequency measurement based on configuration 2 and configuration 3, which are newly added to Table 11, are summarized as follows.

TABLE 12

| Parameter | Value |
|---|---|
| Measurement bandwidth | 6 RBs and 50 RBs |
| System bandwidth | 50 RB |
| Number of DL subframes for half (5 ms) of radio frame length | 1 |
| RSRP L1 measurement period | 480 ms/240 ms |
| Measurement sample rate per L1 measurement period    Configuration 2 | — |
| Configuration 3 | — |
| L3 filtering | Disabled |
| Gap length | 6 ms |
| Gap period | 80 ms |
| Number of transmission antennas | 1 |
| Number of reception antennas | 2 |
| DRX/DTX | OFF |
| Propagation conditions | ETU70, AWGN |
| Interference from other cells [Iot] | −70 dBm |
| Ês/Iot | −8 dB, −6 dB, −3 dB, 0 dB, 3 dB |

Meanwhile, a simulation metric is delta RSRP/RSRQ obtained from a CDF curve without considering an RF impairment margin.

Simulation metrics are as follows.

Delta RSRP=estimated RSRP−ideal RSRP [dB]

Checking point: 5%-xile, 50%-xile, 95%-xile point on CDF curves

Delta RSRQ=estimated RSRQ−ideal RSRQ [dB]

Checking point: 5%-xile, 50%-xile, 95%-xile point on CDF curves

To sum up, the present specification suggests the measurement periods ($T_{Measurement\_Period\_TDD\_Inter}$) including the new configurations for a case where two cells use different TDD UL-DL configurations according to the eIMTA scheme. The new configurations are based on TDD UL-DL configuration 0 and TDD UL-DL configuration 6 in which there is one downlink subframe for the half (5 ms) of the radio frame length.

Further, the present specification suggests that the serving cell transmits a signal for distinguish existing configuration 0 and existing configuration 1 to the UE. Also, the present specification suggests that the serving cell transmits a signal for distinguish existing configuration 0 and existing configuration 2 to the UE. In addition, the present specification suggests that the serving cell transmits a signal for distinguish existing configuration 1 and new configuration 3 to the UE.

Figure 14:
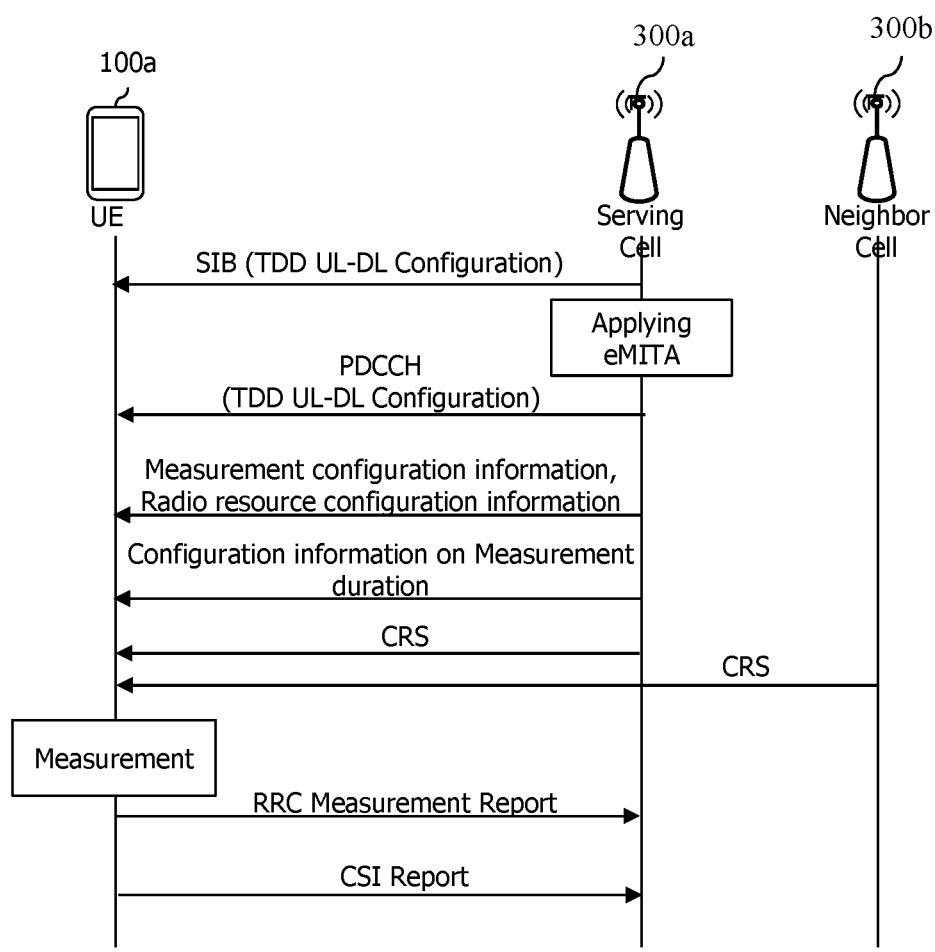
FIG. 14 illustrates signal flow according to one disclosure of the present specification.

FIG. 14 illustrates signal flow according to one disclosure of the present specification.

FIG. 14 illustrates a serving cell 300a of a UE 100 and a neighbor cell 300b. The serving cell 300a is operating in frequency band X, and the neighbor cell 300b is operating in frequency band Y. Frequency band X and frequency band Y are different inter-bands. Further, it is assumed that both the serving cell 300a and the neighbor cell 300b are operating based on TDD, using TDD UL-DL configurations.

First, the serving cell 300a broadcasts an SIB including information on a TDD UL-DL configuration, for example, TDD UL-DL configuration 0 listed in Table 1.

Subsequently, when the serving cell 300a determines to apply eIMTA, the serving cell 300a may transmit information on a changed TDD UL-DL configuration to the UE through a PDCCH.

The UE 100 receives, from the serving cell 300a, measurement configuration information and radio resource configuration information.

When the number of downlink subframes for 5 ms is changed according to the changed TDD UL-DL configuration, the UE 100 receives configuration information relating to a measurement period ($T_{Measurement\_Period\_TDD\_Inter}$) according to the number of downlink subframes. The configuration information may be any one of configuration 0 to configuration 3 listed in Table 12.

The UE 100 measures RSRP and RSRQ during the measurement period ($T_{Measurement\_Period\_TDD\_Inter}$) using CRSs received from the serving cell 300a and the neighbor cell 300b.

When the measurement results satisfy predetermined measurement accuracy, the UE 100 reports the measured RSRP and RSRQ to the serving cell through a higher layer.

The aforementioned embodiments of the present invention may be implemented through various means. For example, the embodiments of the present invention may be implemented in hardware, firmware, software, or a combination thereof, which will be described in detail with reference to the drawing.

Figure 15:
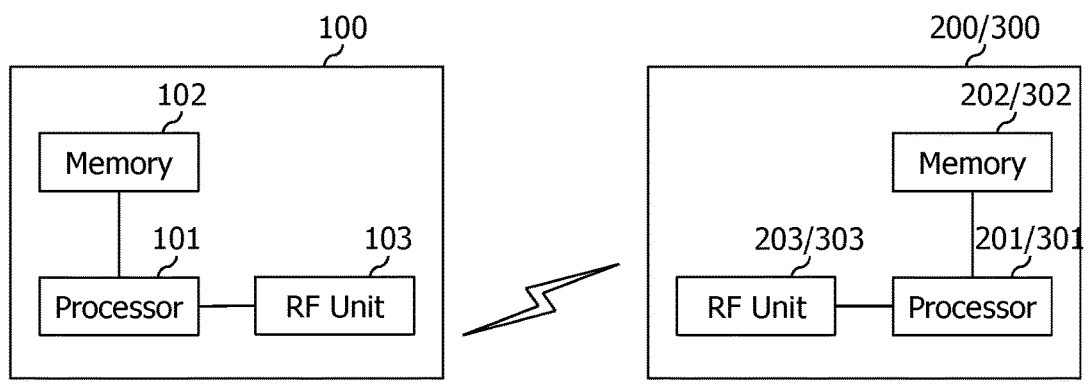
FIG. 15 is a block diagram illustrating a wireless communication system according to a disclosure of the present specification.

FIG. 15 is a block diagram illustrating a wireless communication system according to a disclosure of the present specification.

ABS 200/300 includes a processor 201/301, a memory 202/302, and a radio frequency (RF) unit 203/303. The memory 202/302 is connected with the processor 201 and stores various pieces of information for driving the processor 201/301. The RF unit 203/303 is connected with the processor 201/301 and transmits and/or receives radio signals. The processor 201/301 implements proposed functions, procedures, and/or methods. In the aforementioned embodiments, operations of the BS may be implemented by the processor 201/301.

A UE 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements proposed functions, procedure, and/or methods.

The processors may include an application-specific integrated circuit (ASIC), a separate chipset, a logic circuit, and/or a data processing unit. The memories may include a read-only memory (ROM), a random access memory (RAM), a flash memory, a memory card, a storage medium, and/or other equivalent storage devices. The RF units may include a base-band circuit for processing a radio signal. When the embodiments are implemented in software, the aforementioned methods can be implemented with a module (i.e., process, function, etc.) for performing the aforementioned functions. The module may be stored in the memories and be performed by the processors. The memories may be located inside or outside the processors and be connected to the processors via various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for performing measurement, the method comprising: receiving measurement configuration information and radio resource configuration information from a serving cell; receiving configuration information on a measurement period when a frequency band of the serving cell and a frequency band of a neighbor cell are different and correspond to inter-bands, the configuration information on the measurement period indicating a configuration in which there is one downlink subframe for 5 ms when the serving cell operates with TDD UL-DL configuration 0 or 6; and performing measurement for reference signals from the serving cell and the neighbor cell during the measurement period.

2. The method of claim 1, further comprising:
receiving a system information block (SIB) comprising information on a TDD UL-DL configuration of the serving cell; and
receiving a downlink control channel comprising information on a changed TDD UL-DL configuration as the serving cell applies enhanced Interference Management and Traffic Adaptation (eIMTA).

3. The method of claim 2, wherein the configuration information on the measurement period indicates a configuration based on number of downlink subframes for 5 ms according to the changed TDD UL-DL configuration by application of eIMTA.

4. The method of claim 1, wherein the measurement period is 480 ms when there is one downlink subframe for 5 ms and a measurement band is six resource blocks (RBs) and the measurement period is 240 ms when there is one downlink subframe for 5 ms and a measurement band is 50 RBs.

5. A user equipment (UE) that performs measurement, the UE comprising: a transceiver to receive measurement configuration information and radio resource configuration information from a serving cell and to receive configuration information on a measurement period when a frequency band of the serving cell and a frequency band of a neighbor cell are different inter-bands, the configuration information on the measurement period indicating a configuration in which there is one downlink subframe for 5 ms when the serving cell operates with TDD UL-DL configuration 0 or 6; and a processor to control the transceiver to perform measurement for reference signals from the serving cell and the neighbor cell during the measurement period.

6. The UE of claim 5, wherein the transceiver receives a system information block (SIB) comprising information on a TDD UL-DL configuration of the serving cell, and receives a downlink control channel comprising information on a changed TDD UL-DL configuration as the serving cell applies enhanced Interference Management and Traffic Adaptation (eIMTA).

7. The UE of claim 6, wherein the configuration information on the measurement period indicates a configuration based on number of downlink subframes for 5 ms according to the changed TDD UL-DL configuration by application of eIMTA.

8. The UE claim 5, wherein the measurement period is 480 ms when there is one downlink subframe for 5 ms and a measurement band is six resource blocks (RBs) and the measurement period is 240 ms when there is one downlink subframe for 5 ms and a measurement band is 50 RBs.

* * * * *